Patented Sept. 28, 1926.

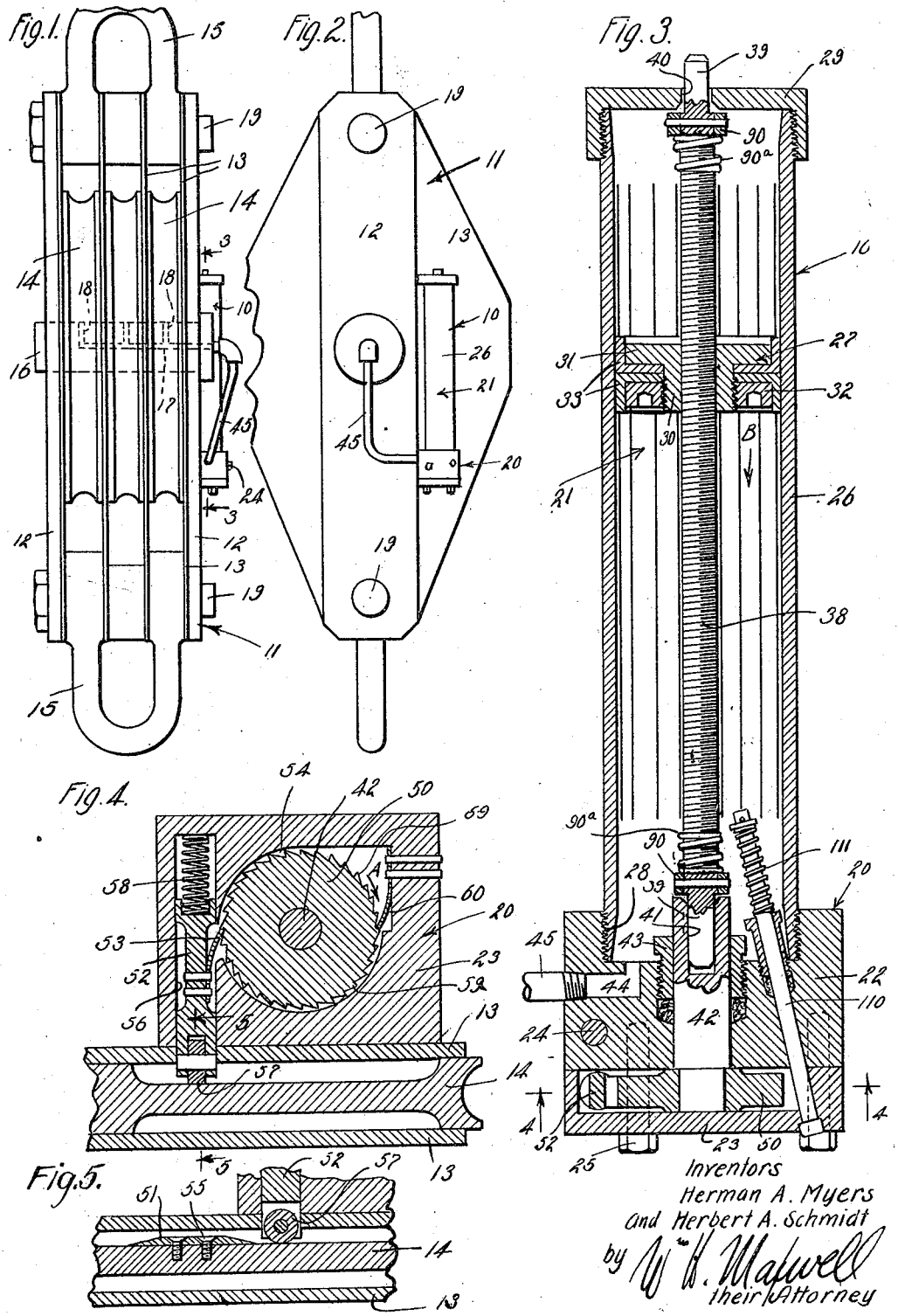

1,601,186

UNITED STATES PATENT OFFICE.

HERMAN A. MYERS AND HERBERT A. SCHMIDT, OF BREA, CALIFORNIA.

LUBRICATING DEVICE.

Application filed February 19, 1923. Serial No. 620,080.

This invention has to do with a lubricating device particularly applicable to blocks, and other similar devices or mechanisms, and it is an object of the invention to provide an effective, reliable and economical lubricating device.

Blocks, such as are used in well drilling rigs and in many other situations, are usually used only intermittently, but when they are used carry great loads. It is, therefore, highly desirable, if not essential, that they be lubricated thoroughly and so that they be always in condition for operation. In the past various wick feed devices, etc., have been used for lubricating blocks, and the like, but these devices have not been wholly satisfactory for various reasons. For instance, wick feed lubricators will handle only liquid lubricants, are not positive and, therefore, not reliable in their operation, and operate or feed continuously, and are, therefore, not efficient.

It is an object of this invention to provide a lubricating device suitable for blocks, and the like, which overcomes the disadvantages of lubricating devices usually employed on such devices, and which is simple, inexpensive and reliable.

It is another object of this invention to provide a lubricating device for a block, or the like, which operates to positively feed the lubricating material to the necessary parts only when the block is in operation.

Another object of this invention is to provide a construction and arrangement of parts in a lubricating device, which makes the device simple and inexpensive to manufacture and convenient to handle and fill.

The various objects and features of our invention will be best and more fully understood from the following detailed description of a typical preferred embodiment and application of the invention, throughout which reference is had to the accompanying drawings, in which:

Fig. 1 is a view showing a typical block equipped with a lubricating device embodying the present invention;

Fig. 2 is another view of the block shown in Fig. 1, being a view taken as indicated by line 2—2 on Fig. 1;

Fig. 3 is an enlarged detail sectional view of the lubricator, embodying the present invention, being a view taken as indicated by line 3—3 on Fig. 1;

Fig. 4 is a sectional view taken as indicated by line 4—4 on Fig. 3; and

Fig. 5 is a sectional view, taken as indicated by line 5—5 on Fig. 4.

In the drawings, numeral 10 designates, generally, the lubricating device provided by the present invention; numeral 11 designates, generally, a typical block in combination with which we have arranged the lubricating device 10. The block 11, illustrated in the drawings, includes a shell, having side parts 12, spacer plates 13, wheels 14, carried in the shell, and bails 15, arranged at the ends of the shell. The wheels 14 are carried on a shaft 16, which extend between the side parts 12 of the shell and through the spacer plates, in the manner illustrated in Fig. 1. An opening 17 extends longitudinally into the shaft from one end, and openings 18 are formed radially in the shaft at the points where the shaft supports the wheels 14 so that the opening 17 is connected with the bearings of the wheels 14. The openings 17 and 18 form passages through which a suitable lubricant can be fed to the bearings of the wheels 14 from one end of the shaft 16. The bails 15 are arranged at the ends of the shell of the block and are connected with the shell by suitable bolts 19. It is to be understood that the particular block construction just described, is merely a typical form of construction commonly used in devices of this character and that the device of the present invention is, as will hereinafter be more fully pointed out, not limited in any way to use in connection with this particular form of block, or, necessarily, to use in connection with a device or mechanism which is specifically a block. The lubricating device provided by the present invention is applicable to blocks of various kinds, and also to various devices and mechanisms other than blocks, so, therefore, when we use the term "block" we do not, thereby, specifically mean to refer to a block of any particular form or construction but mean to include various forms and constructions of blocks and any other device or devices such as may be broadly analogous to a block.

The device 10 provided by the invention includes, generally, a frame 20, a cylinder and piston mechanism 21, means for operating the piston of the cylinder and piston mechanism in the cylinder thereof; and means whereby the said operating means is automatically operated when the block is operated. In the particular form of the invention illustrated in the drawings, the frame 20 includes a body part 22, and a plate 23. The body part is adapted to be mounted on a suitable part of the block, for instance, on one of the side parts, by means of suitable bolts 24. The plate 23 is removably mounted on one end of the body 22 by means of suitable cap screws 25.

The cylinder and piston mechanism 21 includes, generally, a cylinder 26, and a piston 27 slidably carried in the cylinder 26. The cylinder 26 may be formed of a piece of tubing, or the like, screw threaded at one end to screw into a suitable screw threaded opening 28, provided in the body portion of the frame and screw threaded at the other end to receive a cap 29, which closes the outer end of the cylinder. The screw threads on the two ends of the cylinder are preferably the same so that the cylinder can be reversed end for end, as will be hereinafter described. In the drawings we show the device arranged so that the cylinder extends upwardly from the frame. This arrangement is satisfactory when grease, or the like, is being used, however, when oil is being used it is preferred to arrange the device so that the cylinder extends downwardly. The piston 27 includes a main part having a hub portion 30 and a flange 31 at one end of the hub portion 30, a ring 32 which screw threads onto the other end of the hub portion 30 of said main part, and suitable packing leathers 33 held between the flange part 31 and the ring 32. The packing leathers 33 pack the piston tightly in the cylinder 26. It will be obvious, of course, that this particular piston construction is merely one which may be employed in carrying out our invention, and that the invention, therefore, is not to be considered in any way limited to this or any other particular form of piston.

The means which we have illustrated in the drawings for operating the piston 27 through the cylinder 26, includes a screw 38 arranged longitudinally in the cylinder 26, and screw threaded through the piston 27. The ends 39 of the screw 38 are squared, the squared portion 39 at the outer end of the cylinder 26 being rotatably carried in an opening 40 provided in the cap 29, and the squared end 39 at the inner end of the cylinder being carried in a square socket 41 in the end of a shaft 42 which is carried by the body of the frame so that it is concentric with the cylinder 26. The end of the screw preferably projects from the cap so that it can be engaged by a wrench if it is desired to operate the device in this manner. We provide longitudinal scores or grooves in the cylinder to prevent rotation of the piston. The scores are located in the cylinder so that they do not prevent rotation of the piston when it is at one of the collars 90 hereinafter described. A suitable packing gland 43 is provided around the shaft 42 so that lubricating material carried in the cylinder will not leak around the shaft. At each end of the screw 38 adjacent the squared part 39 we arrange a collar 90, and at the inner side of each collar we arrange a spring 90$^a$. The collars stop the movement of the piston through the cylinder, and the springs prevent the piston from jarring against the collars.

An opening 44 is formed in the body portion of the frame so that it has communication with the cylinder 26, and a suitable pipe connection 45 is provided between the opening 44 and the opening 17 in the shaft 16.

In accordance with our invention we provide means for operating the piston operating means, when the block is operated, and, in accordance with the preferred form of our invention, this means includes a ratchet wheel 50 connected with the shaft 42, a cam 51 in connection with one of the moving parts of the block, a plunger 52 adapted to be operated by the cam 51, and a pawl 53 connected with the plunger 52 and adapted to cooperate with the ratchet wheel 50. In the form of construction illustrated in the drawings, the ratchet wheel 50 is mounted directly on the shaft 42, and is carried in a suitable recess 54 provided in the plate 23. The cam 51, shown in the drawings, is on the side of the wheel 14 adjacent the side part of the block on which the lubricating device is mounted. Although we have shown the cam 51 as a part attached to the wheel by means of suitable screws 55, it will be obvious that it may be constructed in various other manners, and, in fact, may be formed in, or integral with, the wheel. The plunger 52 is slidably carried in a square opening 56 provided in the plate 23 and extends through the side part of the block so that its end is engaged by the cam 51. It is preferred that a roller 57 be carried on the end of the plunger to engage and cooperate with the cam 51. Further, we provide a return spring 58 between the inner end of the opening 56 and the end of the plunger 52 so that it tends to move the plunger outwardly and, thereby, yieldingly holds it in position so that it properly cooperates with the cam 51. The pawl 53 is preferably a spring pawl mounted directly on the plunger 52 so that it cooperates with the teeth 59 on the ratchet wheel 50. It will be obvious that the movement of the plunger 52, caused by the cam 51, and return spring 58 will cause the pawl 53 to cooperate with the teeth of the ratchet wheel to move or rotate the ratchet wheel in the direction indicated by the arrow "A" in Fig. 4. We find it desirable to mount a spring pawl 60 in the plate 23 so that it cooperates with the rachet teeth to prevent the rachet wheel from rotating in the direction opposite to that indicated by the arrow "A" in Fig. 4.

In practice it is desirable to provide means to indicate when the piston is at the inner end of the cylinder. For this purpose we slidably mount a plunger 110 in the frame so that it has one end extending with the cylinder to be actuated by the piston upon the piston reaching the inner end of the cylinder and having its other end normally carried in the frame and adapted to project from the frame and form a signal when the first mentioned end is actuated by the piston. A spring 111 may be provided in connection with the plunger to normally hold it in its unactuated position.

In the operation of the device the desired lubricant, for instance, grease, oil, or the like, is provided in the cylinder 26 at the inner side of the piston 27. When the block is operated the wheel 14 adjacent the side of the block which carries the lubricating device rotates so that the cam 51 actuates the plunger 52. When the plunger is actuated the pawl 53 cooperates with the teeth of the ratchet wheel 50, so that the ratchet wheel is rotated in the direction indicated by the arrow "A" in Fig. 4. The shaft 42 rotates with the ratchet wheel 50, and drives the screw 38, due to the squared end 39 of the screw, being arranged in the squared socket 41 in the end of the shaft. Rotation of the screw 38 causes movement of the piston 27 inwardly in the cylinder 26 as indicated by the arrow "B", in Fig. 3. The inward movement of the piston forces the lubricant out of the cylinder 26 through the opening 44 and pipe connection 45 into the openings 17 and 18 in the shaft 16.

When the device has been operated until the piston 27 is at the collar 90 at the inner end of the cylinder and piston device, it rotates in the cylinder and does not move further longitudinally in the cylinder upon further operation of the screw. The device may be refilled for further operation by removing the cylinder from the frame, removing the cap, filling the desired lubricant into the outer end of the cylinder, and then returning the cylinder to place in connection with the frame in a reversed position, that is, so that it is turned end for end, and then arranging the cap on the then outer end of the cylinder. When the cylinder is arranged in connection with the frame by screw threading it into the opening 28, provided in the body of the frame, the squared end of the screw 38 takes its position in the socket 41 so that the shaft 42 and screw 38 are connected.

It will be obvious that the present invention provides a device which can be designed and constructed to feed a lubricant at the desired rate by varying the size, shape, or number of projections on the cam 51, by varying the relation between the movement of the plunger and the size of the ratchet wheel, by varying the size or number of teeth on the ratchet wheel, by varying the pitch of the threads of the screw 38, etc. We, therefore, wish it to be distinctly understood that we contemplate various changes and variations in the design and proportions of our device to suit various requirements, and that we do not wish our invention understood as limited to the particular details hereinabove set out.

Having described only a typical preferred form of our invention we do not wish to limit ourselves to the specific details hereinabove set forth, but wish to reserve to ourselves any changes or variations that may appear to those skilled in the art or fall within the scope of the following claims.

Having described a preferred form of our invention, we claim:

1. In a device of the character described including, a cylinder, a piston in the cylinder, means for preventing rotation of the piston in the cylinder except at the ends of the cylinder, an operating screw for the piston arranged in the cylinder and screw threaded through the piston, and stop means for the piston at the ends of the cylinder.

2. A device of the character described including, a cylinder, a piston in the cylinder, grooves in the middle portion only of the cylinder the piston having a part cooperating with the grooves to prevent rotation of the piston in the cylinder at the middle portion thereof, an operating screw for the piston arranged in the cylinder and screw threaded through the piston, and stop means for the piston at the ends of the cylinder.

3. A device of the character described including, a cylinder, a piston in the cylinder, means for preventing rotation of the piston in the cylinder except at the ends of the cylinder, an operating screw for the piston arranged in the cylinder and screw threaded through the piston, collars on the screw at the ends of the cylinder to stop the piston, and springs at the inner sides of the collars.

4. In combination, a block, a frame, mounted on the block, a cylinder, means for attaching either end of the cylinder to the frame, and a piston in the cylinder, a screw arranged in the cylinder, and screw threaded in the piston adapted to be rotated to operate the piston in the cylinder, a shaft carried by the frame, the shaft having a socket in it to receive either end of the screw, means for stopping operation of the piston upon its reaching either end of the cylinder, means for indicating when the piston has reached the end of the cylinder adjacent the frame, a cam on a moving part of the block, a plunger slidably carried by the frame so that it will be operated by the cam, a spring in connection with the plunger for holding it in position to cooperate with the cam, a ratchet wheel mounted on said shaft, a spring pawl mounted on the plunger to cooperate with the ratchet wheel to rotate it in one direction, and a spring pawl carried by the frame to cooperate with the ratchet wheel to prevent it from rotating in the other direction.

In witness that we claim the foregoing we have hereunto subscribed our names this twenty sixth day of January, 1923.

HERMAN A. MYERS.
HERBERT A. SCHMIDT.